(12) United States Patent
Suthar et al.

(10) Patent No.: US 9,676,949 B2
(45) Date of Patent: *Jun. 13, 2017

(54) AQUEOUS DYE INKS WITH POLYMERIC DISPERSANT

(71) Applicant: FUNAI ELECTRIC CO., LTD., Daito-shi, Osaka (JP)

(72) Inventors: Ajay K. Suthar, Lexington, KY (US); Steve Olson, Lexington, KY (US); Sam Norasak, Lexington, KY (US)

(73) Assignee: Funai Electric Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/135,370

(22) Filed: Apr. 21, 2016

(65) Prior Publication Data

US 2016/0340528 A1    Nov. 24, 2016

Related U.S. Application Data

(63) Continuation of application No. 14/719,595, filed on May 22, 2015, now Pat. No. 9,346,967.

(51) Int. Cl.
| | |
|---|---|
| *G01D 11/00* | (2006.01) |
| *C09D 11/03* | (2014.01) |
| *C09D 11/328* | (2014.01) |
| *B41J 2/21* | (2006.01) |
| *C09D 11/107* | (2014.01) |
| *C09D 11/38* | (2014.01) |

(52) U.S. Cl.
CPC ............ *C09D 11/03* (2013.01); *B41J 2/211* (2013.01); *B41J 2/2107* (2013.01); *C09D 11/107* (2013.01); *C09D 11/328* (2013.01); *C09D 11/38* (2013.01)

(58) Field of Classification Search
CPC ...... B41J 2/211; B41J 2/1433; B41J 2/17593; B41J 2/2107; B41J 2/1755; B41J 2/2144; B41J 2/2117; B41J 2/2056; B41J 11/2056; B41J 11/0057; B41J 3/60; C09D 11/03; C09D 11/328; C09D 11/36; C09D 11/40; C09D 11/30; C09D 11/38; C09D 11/322; C09D 11/101; C09D 11/005; C09D 11/54; C09D 11/52
See application file for complete search history.

(56) References Cited

U.S. PATENT DOCUMENTS

| | | |
|---|---|---|
| 5,879,439 A | 3/1999 | Nagai et al. |
| 6,011,098 A | 1/2000 | Kashiwazaki et al. |
| 6,117,921 A | 9/2000 | Ma et al. |
| 6,652,634 B1 | 11/2003 | Akers et al. |
| 6,972,303 B1 | 12/2005 | Miyabayashi et al. |
| 9,346,976 B2 * | 5/2016 | Davies .................. C09D 191/00 |
| 2011/0242154 A1 * | 10/2011 | Roberts ................ C09D 11/324 347/5 |

* cited by examiner

*Primary Examiner* — Juanita D Jackson
(74) *Attorney, Agent, or Firm* — Amster, Rothstein & Ebenstein, LLP

(57) ABSTRACT

An ink composition including at least one aqueous carrier, at least one color dye, and at least one polymeric dispersant selected such that the ink composition minimizes debris in a printhead.

19 Claims, 2 Drawing Sheets

AQUEOUS DYE INKS WITH POLYMERIC DISPERSANT

RELATED APPLICATION

This application is a continuation of and claims priority to U.S. patent application Ser. No. 14/719,595, filed May 22, 2015, now U.S. Pat. No. 9,346,967, entitled Aqueous Dye Inks With Polymeric Dispersant, the contents of which are incorporated herein by reference in their entirety.

FIELD

This invention is related to ink formulations, and in particular, to aqueous dye inkjet inks that include a polymeric dispersant.

BACKGROUND

Inkjet printing is a non-impact method of printing that involves ejecting ink from a nozzle onto paper or other print media. The actual ink ejection method may occur via several processes, for example, electrostatic field manipulation, ejection by one or more piezoelectric elements, or electrical resistance heating for flash vaporization, to name a few.

SUMMARY OF THE INVENTION

According to an exemplary embodiment of the present invention, an ink composition comprises:
at least one color dye in an amount between and including 1% by weight and 7% by weight; at least one polymeric dispersant in an amount between and including 0.1% by weight and 1% by weight; at least one organic solvent in an amount between and including 18% by weight and 22% by weight; at least one surfactant in an amount between and including 0.5% by weight and 1.5% by weight; at least one buffer in an amount between and including 0.1% by weight and 0.5% by weight; at least one biocide in an amount between and including 0.05% by weight and 0.2% by weight; and the balance being deionized water.

In embodiments, the polymeric dispersant comprises a hydrophobic portion.

In embodiments, the hydrophobic segment of the polymeric dispersant comprises one or more phenolic groups.

In embodiments, the hydrophilic segment of the polymeric dispersant comprises one or more acidic functional groups.

In embodiments, the polymeric dispersant comprises a hydrophobic segment and a hydrophilic segment.

In embodiments, the polymeric dispersant has a glass transition temperature between −30° C. and −40° C.

In embodiments, the polymeric dispersant comprises an acrylic polymer.

In embodiments, the acrylic polymer has moieties of methacrylic acid, poly(polypropylene glycol)-4 nonphenyl ether acrylate, and poly(ethylene glycol)2,4, 6,-tris-(1-phenylethyl) phenyl ether methacrylate.

In embodiments, the molar ratio of methacrylic acid, poly(polypropylene glycol)-4 nonphenyl ether acrylate, and poly(ethylene glycol)2,4,6,-tris-(1-phenylethyl) phenyl ether methacrylate is between 4:1:1 and 18:1:1.

In embodiments, the ink composition has a detergent effect upon polymeric debris According to an exemplary embodiment of the present invention, a printhead comprises a reservoir for holding a supply of ink, and the ink comprises: at least one color dye in an amount between and including 1% by weight and 7% by weight; at least one polymeric dispersant in an amount between and including 0.1% by weight and 1% by weight; at least one organic solvent in an amount between and including 18% by weight and 22% by weight; at least one surfactant in an amount between and including 0.5% by weight and 1.5% by weight; at least one buffer in an amount between and including 0.1% by weight and 0.5% by weight; at least one biocide in an amount between and including 0.05% by weight and 0.2% by weight; and the balance being deionized water.

In embodiments, the polymeric dispersant comprises a hydrophobic portion.

In embodiments, the hydrophobic segment of the polymeric dispersant comprises one or more phenolic groups.

In embodiments, the hydrophilic segment of the polymeric dispersant comprises one or more acidic functional groups.

In embodiments, the polymeric dispersant comprises a hydrophobic segment and a hydrophilic segment.

In embodiments, the polymeric dispersant has a glass transition temperature between −30° C. and −40° C.

In embodiments, the polymeric dispersant comprises an acrylic polymer.

In embodiments, the acrylic polymer has moieties of methacrylic acid, poly(polypropylene glycol)-4 nonphenyl ether acrylate, and poly(ethylene glycol)2,4, 6,-tris-(1-phenylethyl) phenyl ether methacrylate.

In embodiments, the molar ratio of methacrylic acid, poly(polypropylene glycol)-4 nonphenyl ether acrylate, and poly(ethylene glycol)2,4,6,-tris-(1-phenylethyl) phenyl ether methacrylate is between 4:1:1 and 18:1:1.

In embodiments, the printhead further comprises a nozzle in fluid communication with the reservoir and the ink composition agglomerates debris disposed on a surface of the nozzle.

Other features and advantages of embodiments of the invention will become readily apparent from the following detailed description, the accompanying drawings and the appended claims.

BRIEF DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

Figure 1:
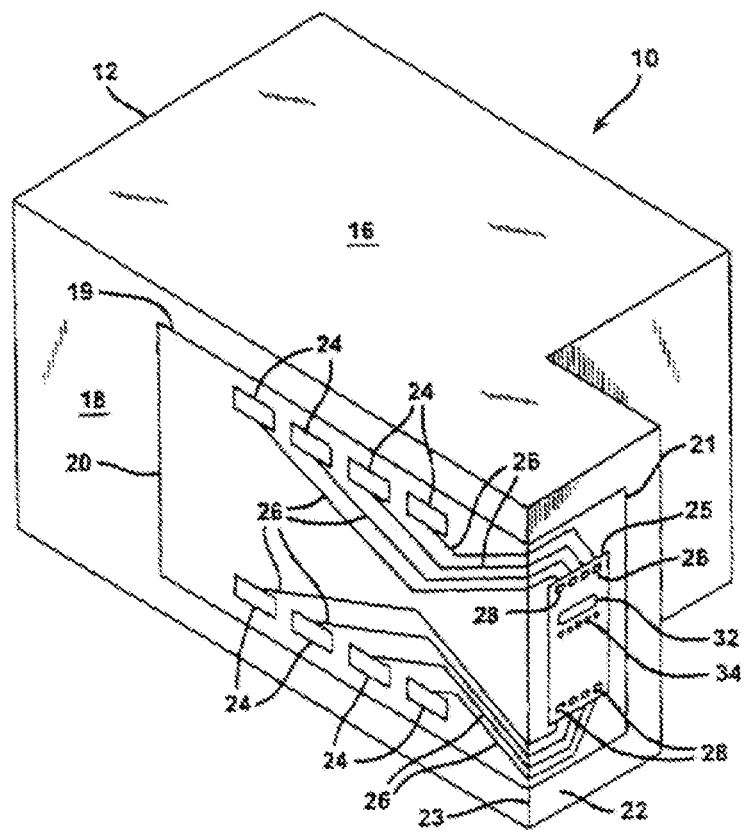
FIG. 1 is a perspective view of a conventional inkjet printhead.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

The present invention generally relates to aqueous, i.e., water-based, ink compositions for use in inkjet printing applications.

With reference to FIG. 1, a conventional inkjet printhead of the present invention is shown generally as 10. The printhead 10 has a housing 12 formed of any suitable material for holding ink. Its shape can vary and often depends upon the external device that carries or contains the printhead. The housing has at least one internal compartment 16 for holding an initial or refillable supply of ink, such as black ink, photo ink, cyan ink, magenta ink, and/or yellow ink. In embodiments, a printhead may contain multiple internal compartments for holding ink. It will be appreciated, however, that while the compartment 16 is shown as locally integrated within a housing 12 of the printhead, it may alternatively connect to a remote source of ink and receive supply, for example, from a tube.

Adhered to one surface 18 of the housing 12 is a portion 19 of a flexible circuit, especially a tape automated bond (TAB) circuit 20. The other portion 21 of the TAB circuit 20 is adhered to another surface 22 of the housing. In this embodiment, the two surfaces 18, 22 are perpendicularly arranged to one another about an edge 23 of the housing.

The TAB circuit 20 supports a plurality of input/output (I/O) connectors 24 for electrically connecting a heater chip 25 to an external device, such as a printer, fax machine, copier, photo-printer, plotter, all-in-one, etc., during use. Pluralities of electrical conductors 26 exist on the TAB circuit 20 to electrically connect and short the I/O connectors 24 to the input terminals (bond pads 28) of the heater chip 25. In embodiments, any number and/or configuration of connections may be provided.

The heater chip 25 contains a column 34 of a plurality of fluid firing elements that serve to eject ink from compartment 16 during use. The fluid firing elements may embody resistive heater elements formed as thin film layers on a silicon substrate. In embodiments, other types of configurations, such as those with piezoelectric elements, may be used. The pluralities of fluid firing elements in column 34 are shown adjacent an ink via 32 as a row of five dots but in practice may include several hundred or several thousand fluid firing elements.

Figure 2:
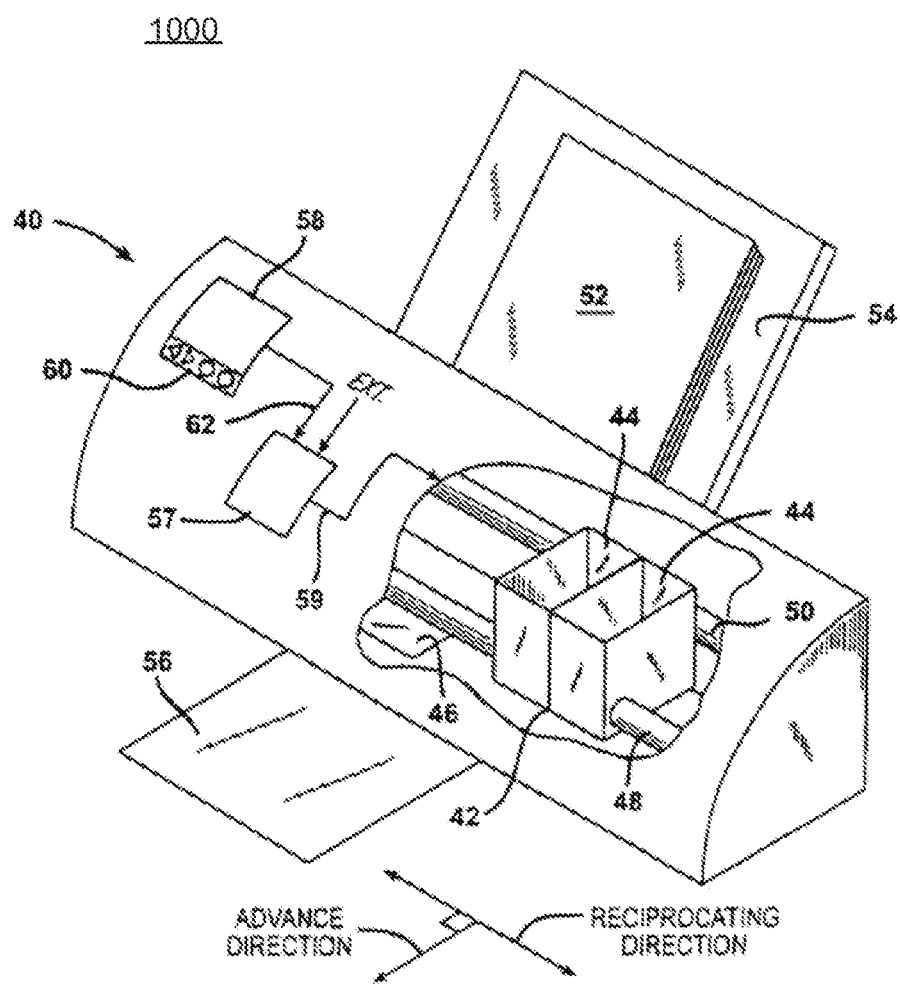
FIG. 2 is a perspective view of a conventional inkjet printer.

With reference to FIG. 2, an external device in the form of an inkjet printer for containing the printhead 10 is shown generally as 40. Inkjet printer 40 and inkjet printhead 10 may together form an inkjet printing system 100.

The printer 40 includes a carriage 42 having a plurality of slots 44 for containing one or more printhead 10. The carriage 42 reciprocates (in accordance with an output 59 of a controller 57) along a shaft 48 above a print zone 46 by a motive force supplied to a drive belt 50. The reciprocation of the carriage 42 occurs relative to a print medium, such as a sheet of paper 52 that advances in the printer 40 along a paper path from an input tray 54, through the print zone 46, to an output tray 56.

While in the print zone, the carriage 42 reciprocates in the Reciprocating Direction generally perpendicularly to the paper 52 being advanced in the Advance Direction as shown by the arrows. Ink drops from compartment 16 (FIG. 1) are caused to be ejected from the heater chip 25 at such times pursuant to commands of a printer microprocessor or other controller 57. The timing of the ink drop emissions corresponds to a pattern of pixels of the image being printed. Often times, such patterns become generated in devices electrically connected to the controller 57 (via Ext. input) that reside externally to the printer for example, a computer, a scanner, a camera, a visual display unit, and/or a personal data assistant, to name a few.

To print or emit a single drop of ink, the fluid firing elements (the dots of column 34, FIG. 1) are uniquely addressed with a small amount of current to rapidly heat a small volume of ink. This causes the ink to vaporize in a local ink chamber between the heater and the nozzle plate and eject through, and become projected by, the nozzle plate towards the print medium. The fire pulse required to emit such ink drop may embody a single or a split firing pulse and is received at the heater chip on an input terminal (e.g., bond pad 28) from connections between the bond pad 28, the electrical conductors 26, the I/O connectors 24 and controller 57. Internal heater chip wiring conveys the fire pulse from the input terminal to one or many of the fluid firing elements.

A control panel 58, having user selection interface 60, also accompanies many printers as an input 62 to the controller 57 to provide additional printer capabilities and robustness.

In embodiments, an inkjet printing system may include a differently-configured printer and/or differently-configured printhead than described above.

According to exemplary embodiments of the present invention, it has been discovered through empirical testing that inkjet printheads (e.g., inkjet printhead 10) may accumulate debris at nozzle ejection sites over time. Such debris may include, for example, portions of ink stored in the printhead (e.g., dried and/or burnt ink particles), components of the inkjet printhead and/or an imaging device that have deteriorated (e.g. portions of polymeric nozzle wiper mechanisms used in maintenance operations), and/or particulate from the surrounding environment, to name a few. Such debris may interfere with the operation of a printhead, e.g., may present a blockage to proper ejection of ink, may contaminate fresh ink stored therein, and/or may affect the quality of ink droplets ejected onto a medium, to name a few.

Accordingly, it would be desirable to produce an ink composition suitable for inkjet printing while contributing to the minimization, prevention, and/or reduction of debris formed at nozzle ejection sites and/or other locations of a printhead.

According to an exemplary embodiment of the present invention, an ink composition includes an aqueous carrier, a dye, and a dispersant. In embodiments, ink compositions may include other components, as described further herein.

An aqueous carrier used in ink compositions of the present invention may include a form of water, for example, de-ionized water. The aqueous carrier may also include one or more water-soluble solvents, for example, alcohols, ketones, ethers, esters, polyhydric alcohols, lower alkyl mono- or di-ethers derived from alkylene glycols, nitrogen-containing cyclic compounds, sulfur-containing compounds, or mixtures thereof. In embodiments, an aqueous carrier may include a different water-soluble solvent. In embodiments, an aqueous carrier may be composed of, for example, between and including 70% and 80% de-ionized water.

Dyes used in the ink composition of the present invention may be, for example, acid dyes, direct dyes, food dyes, reactive dyes, nitro dyes, nitroso dyes, azo dyes (such as mono-azo, di-azo, and poly-azo dyes), mordant dyes, or any combination thereof. In embodiments, a different type of dye may be used. It will be understood that dyes used in the ink composition of the present invention may be one or more suitable colors, for example, black, cyan, magenta, or yellow, to name a few. In embodiments, a dye may be a different color. In embodiments, one or more dyes may form, for example, between and including about 3% and about 5% of an ink composition.

As described above, ink compositions according to the present invention may include a dispersant to facilitate distribution of components of the ink composition. One or more particular dispersants may be chosen to provide an ink composition with a desirable print quality and optical density characteristics.

In embodiments, a polymeric dispersant may be chosen, for example, a graft copolymer having a hydrophilic polymeric segment and a hydrophobic polymeric segment. In embodiments, a polymeric dispersant may include an acrylic polymer having moieties of methacrylic acid (MAA); poly(propylene glycol)-4-nonylphenyl ether acrylate (NPHPPG); and poly(ethylene glycol)2,4,6-tris-(1-phenylethyl) phenyl ether methacrylate (TRISA); and having a low glass transition temperature, for example, Lexmark 1329A, available from Lexmark International, Inc., of Lexington, Kentucky. In embodiments, the molar ratio of MAA:NPHPPG:TRISA in a selected polymeric dispersant may range from about 4:1:1 to about 18:1:1, for example, the molar ratio of MAA:NPHPPG:TRISTA may be 15:1:1. In another example, the molar ratio of MAA:NPHPPG:TRISTA in a selected polymeric dispersant may be 6.2:1:1. This polymer and its polymerization is more particularly described in U.S. Pat. No. 6,652,634, the entire contents of which are incorporated by reference herein. In embodiments, the polymeric dispersant may have a glass transition temperature of between −30° C. and −40° C., for example, −35° C.

The hydrophilic portion of the polymer may provide polymer solubility in the ink composition such that the dispersant can be distributed throughout the ink composition. The hydrophilic segment may include acidic functional groups, such as carboxylic or sulfonic acid groups, and may be prepared, for example, by polymerizing hydrophilic monomers. Hydrophilic segments may contain carboxyl substituents. In embodiments, the hydrophilic segment may be an acrylic or methacrylic polymer or a copolymer thereof In embodiments, the hydrophilic segment may comprise an acrylic copolymer, such as a copolymer of acrylic acid with another monomer, such as styrene, which does not interfere with the hydrophilic character of the segment. In embodiments, the hydrophilic segment may be chosen such that it is long enough to provide stabilization to the dispersant.

The hydrophobic polymeric segment of the ink composition may include, for example, a phenolic group. In embodiments, the hydrophobic segment may include a polymer or copolymer containing a hydrolytically stable linear or branched siloxyl substituent. A siloxyl substituent (an oligomeric siloxane) may have the formula:

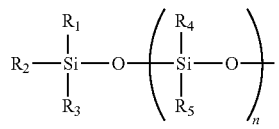

wherein n is from about 1 to about 50, for example, from about 2 to about 16, $R_1$ to $R_5$ are independently alkyl or aryl, for example, lower alkyl ($C_1$-$C_6$), phenyl or benzyl, and may be substituted with a variety of non-interfering substituents. For branched siloxy substituents, $R_4$ and/or $R_5$ may be siloxyl substituents. In embodiments, acryloyl or methacryloyl-terminated polydialkylsiloxane macromers may be preferred hydrophobic polymeric segments. The siloxyl substituent may be hydrolytically stable such that it does not react with water under neutral conditions.

In embodiments, the hydrophobic segment may be an acrylate or methacrylate ester (oxo or thio), or an amide polymer having a siloxyl substituent (e.g., an oligomeric siloxane grafted to a polyacrylate or polymethacrylate).

It will be understood that the various examples of the hydrophobic segments or portions thereof described herein are intended to be non-limiting, and that different hydrophobic segments or portions thereof may be selected for use in polymeric dispersants according to exemplary embodiments of the present invention.

The hydrophobic segment may be chosen such that the polymeric dispersant is caused to attach, e.g., adsorb, to a surface of one or more debris particles within the ink composition and/or on a surface of a printhead within which the ink composition is contained. In this regard, the polymeric dispersant may be adsorbed to debris surfaces via action of the hydrophobic segment such that repulsive forces are generated across debris particles to cause debris to break up, e.g., agglomerate, and/or loosen from a surface such as a surface of a printhead. This may enhance performance of a printhead within which the aqueous dye ink is used, for example, by preventing buildup of debris and/or by agglomerating previously-present debris. Such debris may result in, for example, misdirection of ink droplets ejected from a printhead onto a print medium (e.g., paper) may miss their target positions and/or overlap with one another to cause blank line bands to form in a line-by-line printing process. Through empirical testing, it has been discovered that aqueous dye ink compositions that include polymeric dispersants according to the present invention produce fewer blank line bands in a given printed area as compared to aqueous dye ink compositions that do not include polymeric dispersants.

In this regard, an aqueous dye ink composition may be provided with a polymeric dispersant so that the polymeric dispersant has a detergent effect, e.g., the hydrophilic segment of the polymeric dispersant is soluble with the aqueous carrier while the hydrophobic segment of the polymeric dispersant acts to agglomerate debris with which it contacts. In embodiments, ink compositions according to exemplary embodiments of the present invention may include other additives, for example, biocides, viscosity modifiers, penetrants, humectants, anti-kogation agents, anti-curling agents, chelating agents, anti-bleed agents, binders, and/or buffers, to name a few.

Ink compositions of the present invention may have different amounts of constituent components based upon one or more factors, for example, desired color. In embodiments, an ink composition may include, for example, deionized water between and including 70% by weight and 80% by weight, dye between and including 1% by weight and 7% by weight, solvents between and including 18% and 22% by weight (for example, 1,2 propanediol between and including 5% by weight and 10% by weight, glycol (for example, triethylene glycol or dipropylene glycol) between and including 3% by weight and 7% by weight, 1,3 propanediol, between and including 3% by weight and 8% by weight), polymeric dispersant between and including 0.1% by weight and 1% by weight, surfactant (for example, Silwet® L7600 available from Momentive Performance Materials Inc. of Waterford, NY and/or Triethanolamine (TEA)) between and including 0.5% by weight and 1.5% by weight, buffer (for example, BES buffered saline available from Sigma-Aldrich Corp. of St. Louis, Mo.) between and including 0.1% by weight and 0.5% by weight, and biocide (for example, Proxel® GXL biocide available from Lonza Group Ltd. of Basel, Switzerland) between and including 0.05% by weight and 0.2% by weight. In embodiments, an ink composition may include other components, for example, one or more chelating agents. Referring to Table 1, Table 2, and Table 3 below, respectively, example ink compositions according to the present invention are provided. It will be understood that other ink compositions may be formed according to the present invention described herein.

TABLE 1

| Component | Wt % |
| --- | --- |
| DI Water | 72.1 |
| Cyan dye | 4 |
| 1,2 Propanediol | 7 |
| 1,3 Propanediol | 7 |
| Triethylene Glycol | 6 |
| Lexmark 1329A polymeric dispersant | 0.3 |
| 1,2 Hexanediol | 2.5 |
| Silwet ® L7600 surfactant | 0.8 |
| Triethanolamine (TEA) | 0.4 |
| BES buffered saline | 0.2 |
| Proxel ® GXL biocide | 0.1 |

TABLE 2

| Component | Wt % |
| --- | --- |
| DI Water | 72.1 |
| Magenta dye | 4.0 |
| 1,3 Propanediol | 10.0 |
| 1,5 Pentanediol | 5.0 |
| Dipropylene Glycol | 5.0 |
| Lexmark 1329A polymeric dispersant | 0.3 |
| 1,2 Hexanediol | 2.5 |
| Silwet ® L7600 surfactant | 0.8 |
| Triethanolamine (TEA) | 0.4 |
| BES buffered saline | 0.2 |
| Proxel ® GXL biocide | 0.1 |

TABLE 3

| Component | Wt % |
| --- | --- |
| DI water | 72.3 |
| Yellow dyes | 3.5 |
| 1,3 Propanediol | 10 |
| 1,5 Penanediol | 5 |
| Triethylene Glycol | 5 |
| Lexmark 1329A polymeric dispersant | 0.3 |
| 1,2 Hexanediol | 2.5 |
| Silwet ® L7600 surfactant | 0.8 |
| Triethanolamine (TEA) | 0.4 |
| BES buffered saline | 0.2 |
| Proxel ® GXL biocide | 0.1 |

While particular embodiments of the invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. An ink composition, comprising:
   at least one aqueous carrier;
   at least one color dye;
   at least one surfactant; and
   at least one polymeric dispersant selected such that the ink composition minimizes debris in a printhead.

2. The ink composition of claim 1, further comprising at least one organic solvent.

3. The ink composition of claim 1, further comprising at least one biocide.

4. The ink composition of claim 1, wherein the aqueous carrier is deionized water.

5. The ink composition of claim 1, wherein the at least one polymeric dispersant comprises a hydrophobic portion.

6. The ink composition of claim 1, wherein the at least one hydrophobic segment of the polymeric dispersant comprises one or more phenolic groups.

7. The ink composition of claim 1, wherein the hydrophilic segment of the at least one polymeric dispersant comprises one or more acidic functional groups.

8. The ink composition of claim 1, wherein the at least one polymeric dispersant is a graft copolymer comprising a hydrophobic segment and a hydrophilic segment.

9. The ink composition of claim 1, wherein the at least one polymeric dispersant has a glass transition temperature between −30° C. and −40° C.

10. The ink composition of claim 1, wherein the at least one polymeric dispersant comprises an acrylic polymer.

11. The ink composition of claim 10, wherein the acrylic polymer has moieties of methacrylic acid, poly(polypropylene glycol)-4 nonphenyl ether acrylate, and poly(ethylene glycol)2,4,6,-tris-(1-phenylethyl) phenyl ether methacrylate.

12. The ink composition of claim 11, wherein the molar ratio of methacrylic acid, poly(polypropylene glycol)-4 nonphenyl ether acrylate, and poly(ethylene glycol)2,4,6,-tris-(1-phenylethyl) phenyl ether methacrylate is between 4:1:1 and 18:1:1.

13. The printhead of claim 10, wherein the at least one polymeric dispersant has a glass transition temperature between −30° C. and −40° C.

14. The printhead of claim 10, wherein the at least one polymeric dispersant comprises an acrylic polymer.

15. A printhead comprising:
   a reservoir for holding a supply of ink, the ink comprising:
      at least one aqueous carrier;
      at least one color dye;
      at least one surfactant; and
      at least one polymeric dispersant selected such that the ink composition minimizes debris in the printhead.

16. The printhead of claim 15, wherein the at least one polymeric dispersant comprises a hydrophobic portion.

17. The printhead of claim 15, wherein the hydrophobic segment of the at least one polymeric dispersant comprises one or more phenolic groups.

18. The printhead of claim 15, wherein the hydrophilic segment of the at least one polymeric dispersant comprises one or more acidic functional groups.

19. The printhead of claim 15, wherein the at least one polymeric dispersant is a graft copolymer comprising a hydrophobic segment and a hydrophilic segment.

* * * * *